US012791046B2

(12) United States Patent
Alyami et al.

(10) Patent No.: US 12,791,046 B2
(45) Date of Patent: Nov. 10, 2026

(54) CONTROLLING PIPELINE FLUID TURBULENCE

(71) Applicant: Saudi Arabian Oil Company, Dhahran (SA)

(72) Inventors: Mazyad Alyami, Dammam (SA); Maher Hamed Alerwi, Dhahran (SA); Abdulrahman Mohammed Alqahtani, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 329 days.

(21) Appl. No.: 18/734,567

(22) Filed: Jun. 5, 2024

(65) Prior Publication Data

US 2025/0376999 A1 Dec. 11, 2025

(51) Int. Cl.
*F15D 1/02* (2006.01)

(52) U.S. Cl.
CPC .................................... *F15D 1/02* (2013.01)

(58) Field of Classification Search
CPC ... F15D 1/02; F15D 1/06; F15D 1/065; F15D 1/002; F15D 1/007; F15D 1/009; B01F 25/4311; B01F 25/4313; B01F 25/4318; B01F 25/431973; B01F 25/431971; B01F 25/3131; B01F 25/431972; B01D 17/0214; B01D 17/0211; B01D 19/0042; F24F 13/1426; F24F 13/1413; F24F 13/142; F24F 2013/1433; F16L 55/04; F16L 55/0333; F17D 1/20
USPC .......... 138/39, 37; 366/261, 142; 137/2, 829
See application file for complete search history.

(56) References Cited

U.S. PATENT DOCUMENTS

| | | | | |
|---|---|---|---|---|
| 2,843,368 | A | 7/1958 | Schmidt | |
| 3,297,305 | A | 1/1967 | Walden | |
| 4,191,209 | A * | 3/1980 | Mattson | F24F 11/75 73/861.01 |
| 4,429,581 | A | 2/1984 | Furmaga | |
| 4,487,510 | A * | 12/1984 | Buurman | B01F 25/4311 366/337 |
| 7,311,001 | B2 | 12/2007 | Liu et al. | |
| 8,220,496 | B2 * | 7/2012 | Marica | F04D 29/466 251/118 |
| 2001/0011556 | A1 | 8/2001 | Butler | |

(Continued)

FOREIGN PATENT DOCUMENTS

RU 2690052 C2 5/2019

*Primary Examiner* — Craig M Schneider
*Assistant Examiner* — Joshua D Leary
(74) *Attorney, Agent, or Firm* — Fish & Richardson P.C.

(57) ABSTRACT

Systems and methods for reducing turbulence in a pipeline. The system has a pipe, a first ring rotatably mounted inside the pipe, multiple second rings rotatably mounted inside the pipe downstream of the first ring, and a controller coupled to the first ring and the second rings. The first ring rotates at a rate that varies in response to a velocity of fluid flowing through the pipe. The second rings include a first set of concentric rings controllably rotatable about a first axis and a second set of concentric rings controllably rotatable about a second axis offset from the first axis. The controller determines a flow condition of the fluid at the first ring based on a rate of rotation of the first ring and set positions of the second rings based on the determined flow condition of the fluid at the first ring.

20 Claims, 6 Drawing Sheets

(56) References Cited

U.S. PATENT DOCUMENTS

| | | | | |
|---|---|---|---|---|
| 2010/0155075 | A1 | 6/2010 | Holm | |
| 2019/0017724 | A1* | 1/2019 | Sekar .................. | F24F 13/1426 |

* cited by examiner

CONTROLLING PIPELINE FLUID TURBULENCE

TECHNICAL FIELD

This disclosure relates to controlling a flow condition in a pipeline, for example, by reducing turbulence in the pipeline.

BACKGROUND

Hydrocarbons are trapped in reservoirs in subterranean formations of the Earth. Wellbores are drilled through subterranean formations to those reservoirs and completed to produce the hydrocarbons to a surface of the Earth. The produced hydrocarbons can be stored at the surface in storage facilities, transported to intermediate processing facilities, or transported to downstream refining facilities for further refinement. Some of the storage facilities or intermediate processing facilities can be in remote locations of the oilfield. Pipelines connect the storage and refinement facilities. Sometimes, turbulent flow through the pipelines can damage the pipelines.

SUMMARY

The disclosure describes systems and methods for controlling flow conditions in a pipeline to reduce and control turbulence. In this approach, the flow conditions can be controlled by using a system placed in the pipeline to sense and alter the flow condition. In some implementations, a sensor inside a pipe is used to sense local flow conditions. The rings rotatably mounted inside the pipe downstream of the sensor affect flow conditions in the pipeline. The position of the rings and their effect on the flow can be adjusted by a controller based on the sensed flow conditions.

Implementations of these systems and methods can provide one or more of the following advantages. For example, this approach can increase pipeline life by decreasing erosion. When undesirable turbulent flow is detected, this approach can be used to reduce turbulence in the fluid flow. This reduction in turbulence can reduce the abrasion and wear on the inner surfaces of pipes associated with flow characterized by chaotic, swirling motion of the fluid. This issue is particularly significant in situations where the fluid carries solid particles, like sand or grit, which act as abrasives. Over time, this erosion can weaken pipelines and lead to maintenance or replacement needs.

Perhaps counterintuitively, this approach can also increase pipeline life by increasing turbulence to reduce corrosion associated with flow separation. In some combinations of laminar flow and flow velocity, mixtures of fluids can separate into the constituent fluids, increasing the concentration of a corrosive chemical in one of the constituent fluids. For example, oil can separate from water with the water retaining the corrosive chemicals on a bottom portion of the pipeline and the oil in a top portion of the pipeline. The increased local concentration of the corrosive chemicals can accelerate corrosive wear of the pipeline, decreasing pipeline life. Initiating turbulence in the fluid under these conditions can cause the laminar fluids to mix, reducing the local concentration of the corrosive chemicals and increasing pipeline life.

This approach can improve personnel, equipment, and environmental safety. For example, reducing conditions which cause erosion can increase the time for which the thickness of pipeline walls is maintained within design limits and reduce likelihood of pipeline structural failures due to erosion. When a pipeline fails, people can be hurt, equipment can be damaged, and the environment can be contaminated. By adjusting the flow conditions in real-time responsive to flow conditions, erosion of the pipeline can be reduced, improving personnel, equipment, and environmental safety.

This approach can also reduce downtime in transfer and refinement operations. Sometimes, hydrocarbon flow through pipelines is secured and the pipelines are drained for visual inspection to ensure safe continued operation. By dynamically altering the flow condition of the fluid in the pipeline during operation, erosion can be reduced, extending the required time between inspections. For example, by increasing the lifetime of pipeline and pipeline components, maintenance and replacement of worn components can be spaced out, reducing pipeline downtime.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes systems and methods for controlling flow conditions in a pipeline. The flow conditions can be controlled by sensing a flow condition in the pipeline and alter the flow condition downstream of the sensed location. The system has a sensor used to sense the flow conditions at a first location, concentric rings rotatably mounted downstream of the sensor to alter the flow condition, and a controller to set positions of the concentric rings based on a determined flow condition of the fluid at the sensor.

In some implementations, the sensor is a first ring that rotates at a rate that varies in response to the velocity of the fluid flowing through the pipe. The concentric rings have a first set of concentric rings rotatable about a first axis and a second set of concentric rings rotatable about a second axis offset from the first axis. The controller is coupled to the first ring and the concentric rings. The controller determines a flow condition of the fluid at the first ring based on the rate of rotation of the first ring and set positions of the concentric rings based on the determined flow condition of the fluid at the first ring.

Figure 1:
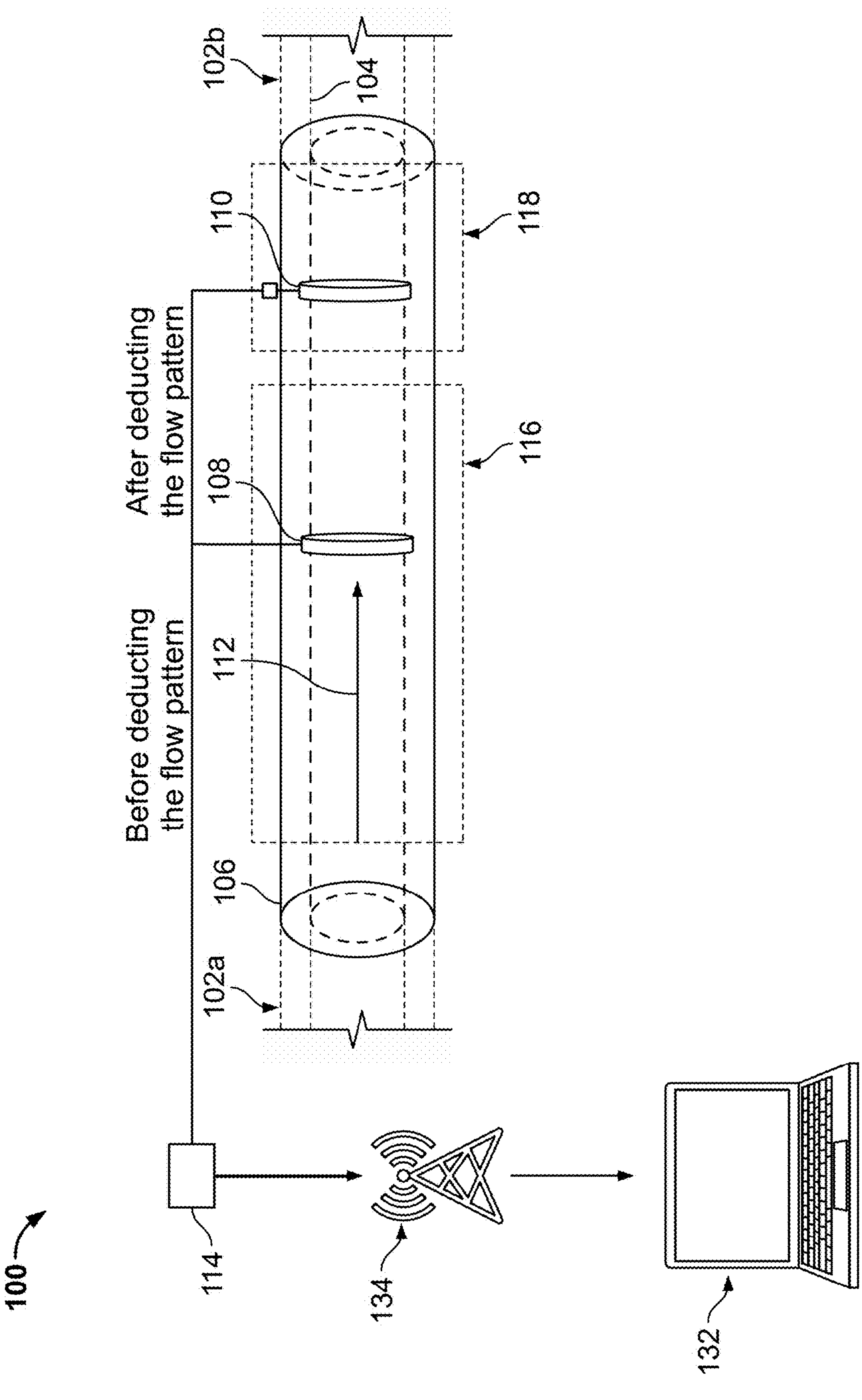
FIG. 1 is a schematic view of a two-stage system for controlling fluid flow turbulence in a pipeline.

FIG. 1 is a schematic view of a system 100 for controlling fluid flow turbulence in a pipeline 102*a-b*. The system 100 is coupled to the pipeline 102*a-b* to control flow conditions in the pipeline 102*a-b* and to reduce erosion and corrosion of the inner surfaces 104 of the pipeline 102*a-b*. Pipelines are used in the oil and gas production and refinement operations to conduct fluids containing hydrocarbons from one location to another location. The system 100 has a pipe 106 placed in the pipeline 102*a-b* to allow the fluid flowing through the pipeline 102*a-b* to pass through the pipe 106, a sensor 108 positioned in the pipe 106 to detect a flow condition of the fluid, multiple concentric rings 110 rotatably mounted inside the pipe 106 downstream (as shown in the direction of arrow 112), and a controller 114 to set positions of the concentric rings 110 based on the detected flow condition. Altering the position of the concentric rings 110 can affect the flow condition downstream from the concentric rings 110, decreasing erosion and corrosion of the inner surface 104 of the pipeline 102*a-b*.

The pipeline 102*a-b* can connect well sites to refining facilities. The fluids containing hydrocarbons, chemicals, and particulates can be transported and distributed via the pipeline 102*a-b* stretching for thousands of kilometers. Sometimes, the elevation and direction of the pipeline 102*a-b* can vary, creating elbows or bends. Sometimes, one or more locations within the pipeline 102*a-b*, for example, at the elbows or bends, can become damaged internally due to several factors, such as erosion and corrosion, causing metal loss and a reduction from the inner surface 104 of the pipeline 102*a-b*, decreasing the wall thickness and leading to leakage or catastrophic failure of the pipeline 102*a-b*, harming equipment, endangering personnel, and harming the environment.

A flow condition of the fluid in the pipeline 102*a-b*, such as the turbulence of the fluid, can be directly proportional to internal damage of the pipeline 102*a-b*. In one example, the turbulence in the fluid flow can increase erosion in the pipeline 102*a-b*. Turbulent flow can be characterized by a chaotic, swirling motion of the fluid, which can lead to increased abrasion and wear on inner surfaces 104 of the pipeline 102*a-b*. This issue is particularly significant in situations where the fluid carries solid particles, like sand or grit, which act as abrasives. Some fluids contain corrosive chemicals which can be maintained in laminar flow next to the inner surface 104 of the pipeline 102*a-b*, further corroding the pipeline 102*a-b*. In other examples, the corrosive chemicals can become stuck in low flow areas of the pipeline 102*a-b*, further corroding the pipeline 102*a-b* in those locations. In some cases, the fluid can be a multi-phase fluid.

In some cases, the flow condition of the fluid in the pipeline 102*a-b* can be characterized based on a level of turbulence. For example, the flow can be a constant flow, a low turbulence flow, a middle turbulence flow, or a high turbulence flow. The flow condition for each level of turbulence can vary based on factors such as the size of pipeline 102*a-b*, the type of fluid in the pipeline 102*a-b*, any particulate or other chemicals in the pipeline 102*a-b*, a temperature of the fluid, and/or the roughness of the pipelines 102*a-b* inner surfaces 104.

The turbulence of the fluid in the pipeline 102*a-b* can affect the erosion and corrosion of the pipeline 102*a-b*. In a low-turbulence flow condition, the fluid flows through the pipeline 102*a-b* in relatively smooth, parallel movement of fluids with minimal intermixing. The erosion of the pipeline 102*a-b* in a low-turbulence flow condition can be less than the erosion in a high-turbulence flow condition. The attenuation of shear and turbulence in low-turbulence conditions can result in a discernible reduction in abrasive effects of the fluid on the inner surfaces 104 of the pipeline 102*a-b*. However, in some cases, low turbulence may not be beneficial, and competing factors may need to be balanced to improve pipeline 102*a-b* life. For example, excessively low turbulence may not be practical or desirable in pipeline operations because consideration of flow rates and specific operational conditions to optimize the interplay of turbulence for enhanced pipeline 102*a-b* performance may be needed. In one instance, while reducing turbulence in the flow can reduce the pressure drop through the pipeline 102*a-b* for a given flow rate, which may be advantageous in situations where minimizing pressure loss is important, such as in certain industrial processes or when transporting viscous fluids. However, achieving low-turbulence flow often requires lower flow velocities, which may not be practical in all situations, especially for high-flow-rate applications So, while reducing pressure drop through low-turbulence flow is possible, the specific operating requirements and constraints of the pipeline 102*a-b* can be used to determine the most suitable flow regime for the given application. In some cases, adjusting the turbulence of the fluid in the pipeline can alter one or more properties of the fluid, such as the velocity, the viscosity, the pressure gradients, and/or the temperature. In some cases, the flow rate for the fluid passing through the pipeline 102*a-b* can be between 100-50,000 barrel per day depending on the size of the pipeline 102*a-b*.

The pipe 106 is coupled to the pipeline 102*a-b*. The pipe 106 passes the fluid from one section of the pipeline 102*a* to another section of the pipeline 102*b* in the downstream direction of arrow 112. The pipe 106 first conducts the fluid past the sensor 108, and then through the concentric rings 110. In this implementation, the pipe 106 is coupled to the pipeline 102*a-b* by flanged connections (flanges on both the pipe 106 and the pipelines 102*a-b* held together by fasteners) for simplified assembly, disassembly, maintenance, or replacement. In other implementations, both the pipe 106 and the pipeline 102*a-b* have threaded connections and are coupled together by the threaded connections. In some cases, the threaded connections can be preferable for smaller diameter pipelines 102*a-b*, lower pressure applications, or less critical applications. Alternatively, the pipe 106 can be welded to the pipelines 102*a-b*.

The pipe 106 has a first stage 116 and a second stage 118. The first stage 116 is coupled to the second stage 118. The second stage 118 is downstream from first stage 116. The first stage 116 of the pipe 106 receives the fluid from the pipeline 102*a* and conducts the fluid to the second stage 118. The second stage 118 receives the fluid from the first stage 116 and conducts the fluid to the downstream pipeline 102*b*.

Figure 2:
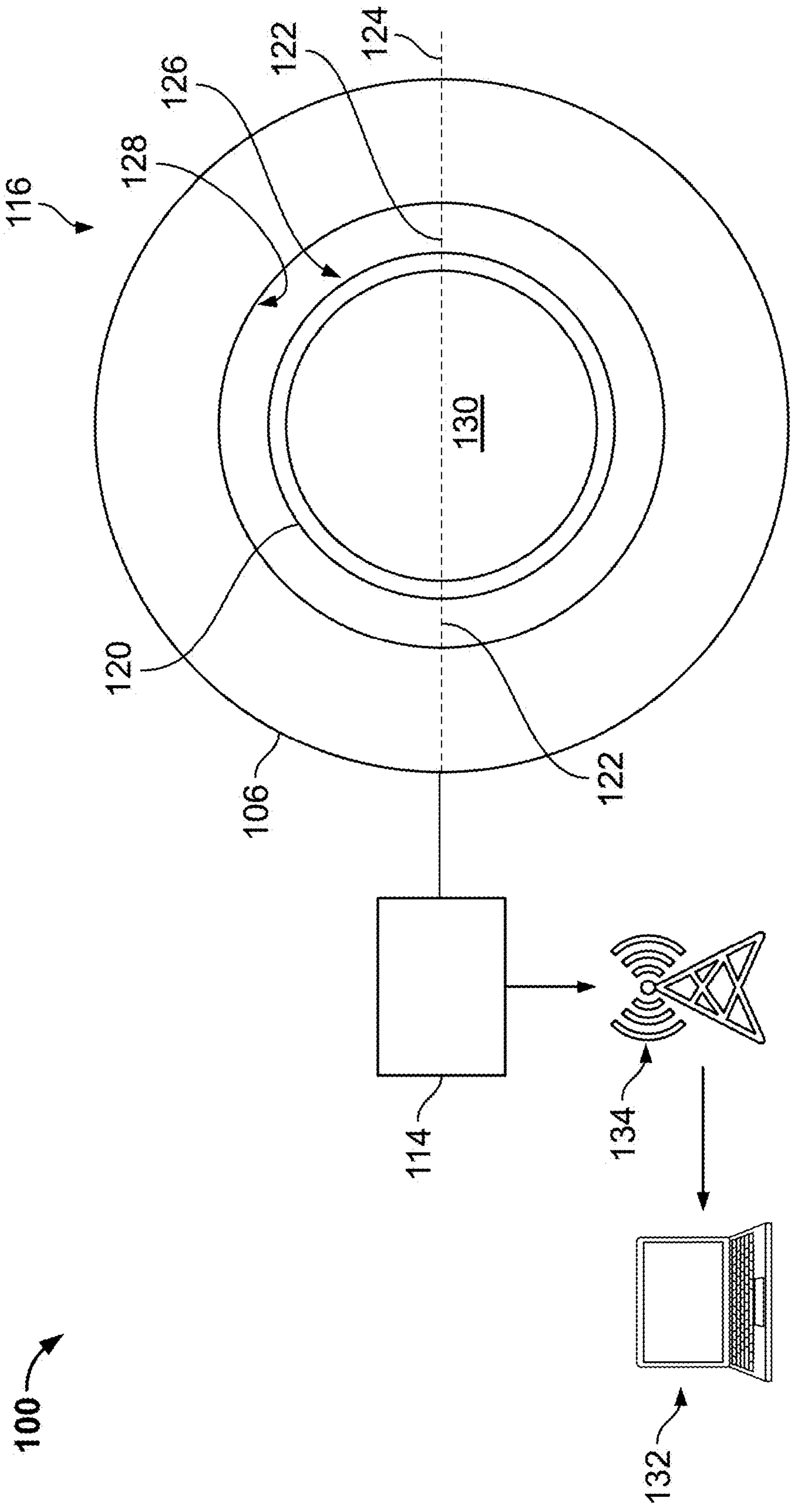
FIG. 2 is a schematic view of a first stage of the two-stage system of FIG. 1.

FIG. 2 is a schematic view of the first stage 116 of the two-stage system 100 of FIG. 1. Referring to FIGS. 1 and 2, the sensor 108 is positioned in the first stage 116 of the pipe 106 to detect the flow condition of the fluid received from the pipeline 102*a*. In this embodiment, the sensor 108 is a first ring 120 situated in the flow. The first ring 120 can move responsive to the fluid flowing past the first ring 120. In some cases, the first ring 120 vibrates in the flow. In other cases, the first ring 120 rotates in the flow. Although the sensor 108 is described as a rotatable ring, any suitable sensor can be used to determine the turbulence of the flow in the first stage 116.

The sensor 108 has a shaft 122. The first ring 120 is mounted to the shaft 122. The shaft 122 defines a first axis 124 defined by a diameter of the pipe 106. The first ring 120 is rotatably coupled to the shaft 122. The first ring 120 is free to rotate within the first stage 116 responsive to the conditions of the flow of fluid through the first stage 116. The first ring 120 is rotatable about the first axis 124 at a rate that varies in response to a velocity of fluid flowing through the pipe 106. The first ring 120 can rotate responsive to the flow of the fluid at a rate proportional to the rate of the flow of the fluid.

In this embodiment, the first axis 124 is parallel to the surface of the Earth above which the pipe 106 is situated. The first axis 124 bisects the pipe 106.

The shaft 122 has two sections positioned opposite the other in the pipe 106. Each section of the shaft 122 extends from an outer surface 126 of the first ring 120 to an inner surface 128 of the pipe 106. An inner portion 130 (i.e., the center of the pipe 106) is free of obstructions so only a minimum level of disturbance is imparted to the fluid by the first ring 120.

The first ring 120 has a cross-section. The cross-section of the first ring 120 can be a circle or a square with a diameter or a width between one and five millimeters, however, any suitable shape or diameter may be used.

The controller 114 is coupled to the shaft 122. The controller 114 can detect or receive a signal indicating the revolutions per minute, the rate of change of the revolutions per minute, the direction of revolution, and/or the change in direction of rotation of the shaft 122.

As shown in Table 1, the range of revolutions per minute of the first ring 120 can be divided into multiple ranges and associated with a given flow condition. For example, the ranges of revolutions per minute can be constant (stable), a low variation, a middle variation, and a high variation.

TABLE 1

First Ring Revolutions Per Minute and Categories of Flow Patterns

| First Ring - Revolutions Per Minute | Categories of Flow Patterns |
|---|---|
| Constant (stable) | Constant Flow |
| Low variation | Low turbulence |
| Mid variation | Mid turbulence |
| High variation | High Turbulence |

Figure 3B:
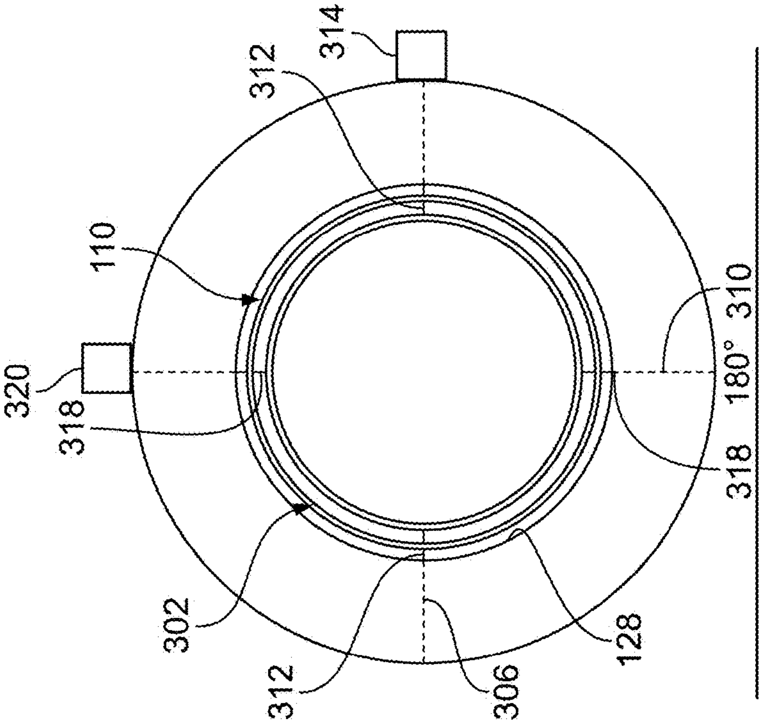
FIGS. 3A-3B are schematic views of a second stage of the two-stage system of FIG. 1 in a first position.
Figure 3A:
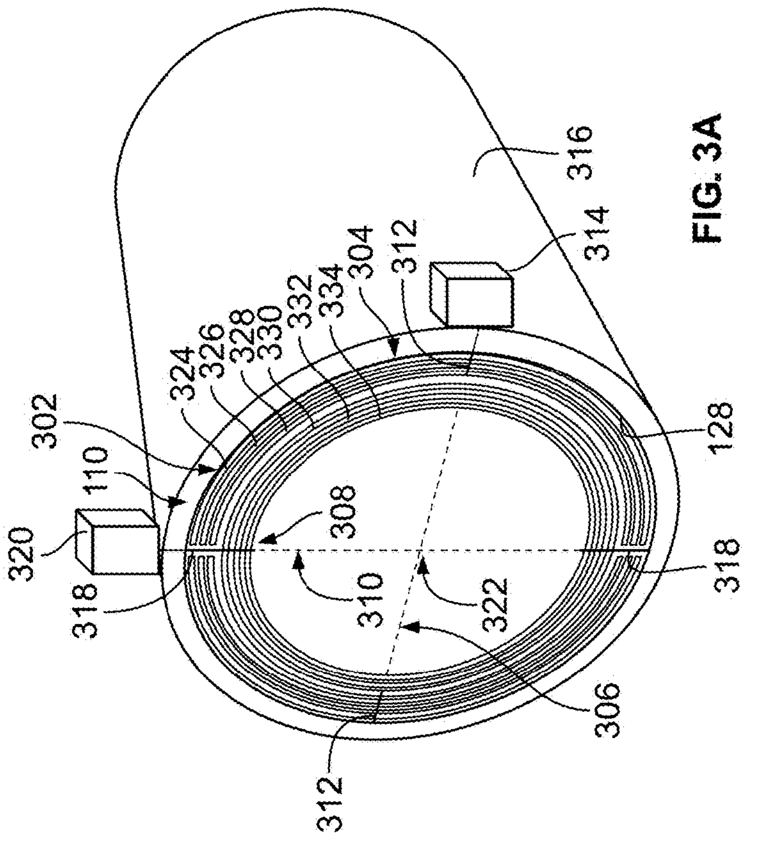
Figure 4:
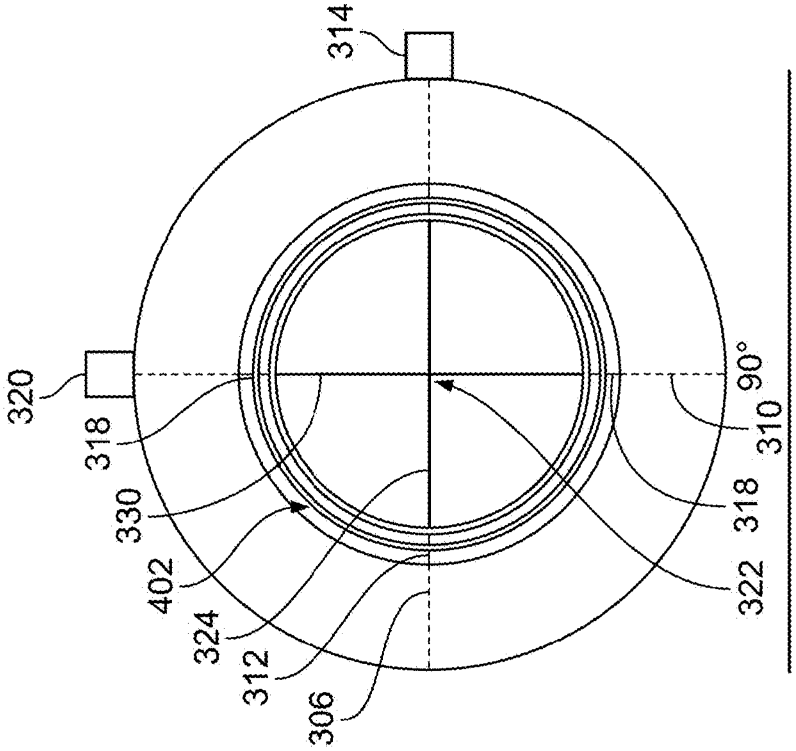
FIG. 4 is schematic view of the second stage of the two-stage system of FIG. 1 in a second position.
Figure 5:
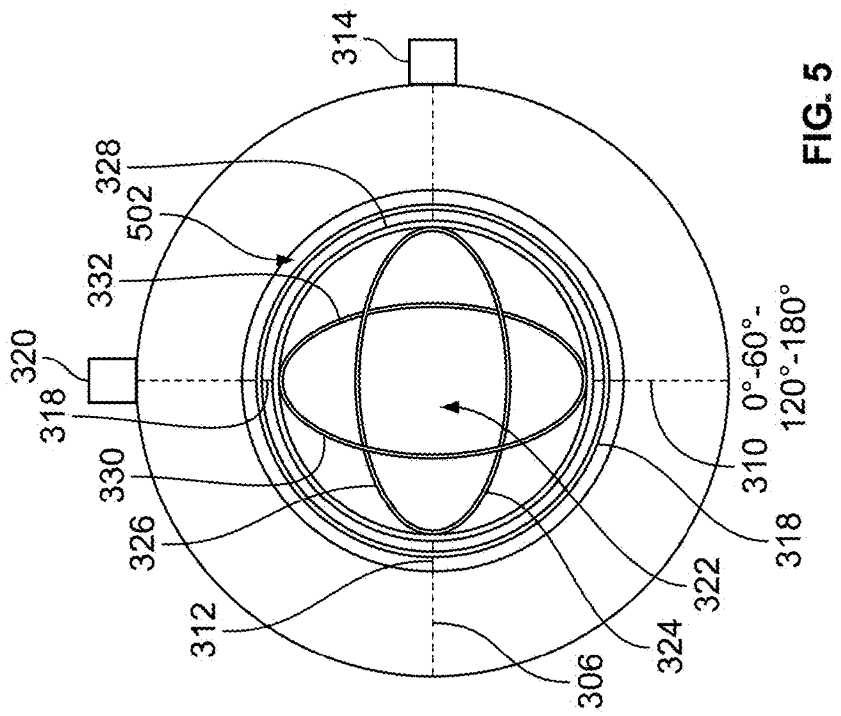
FIG. 5 is schematic view of the second stage of the two-stage system of FIG. 1 in a third position.
Figure 6B:
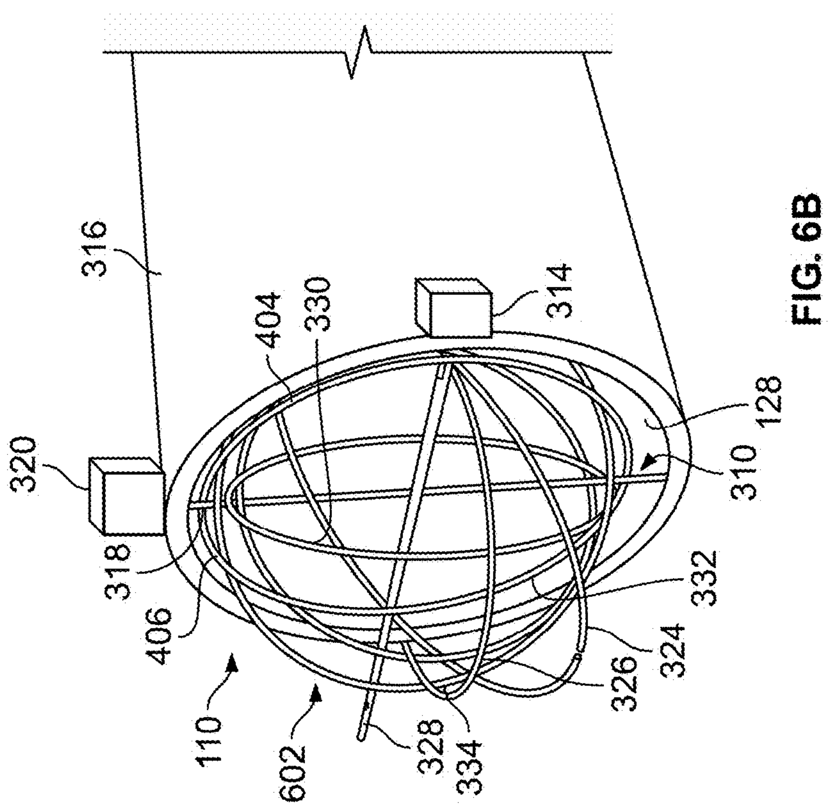
FIGS. 6A-6B are schematic views of the second stage of the two-stage system of FIG. 1 in a fourth position.
Figure 6A:
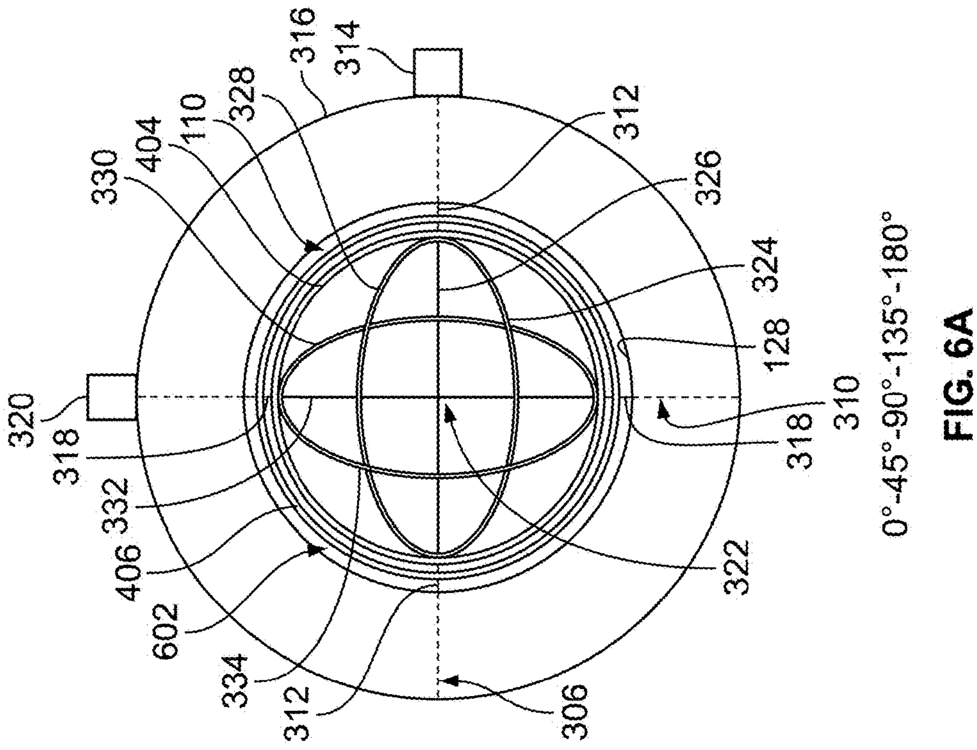

FIGS. 3A-3B are schematic views of the second stage 118 of the two-stage system 100 of FIG. 1 in a first position 302. FIG. 4 is schematic view of the second stage of the two-stage system of FIG. 1 in a second position 402. FIG. 5 is schematic view of the second stage of the two-stage system of FIG. 1 in a third position 502. FIGS. 6A-6B are schematic views of the second stage of the two-stage system of FIG. 1 in a fourth position 602. The second stage 118 includes the concentric rings 110. The concentric rings 110 are second rings in the fluid flow which can be set at different positions (shown in FIGS. 3A-6B) to alter the flow condition of the fluid in the second stage 118 and can be referred to interchangeably as either the concentric rings 110 or the second rings 110. The second rings 110 are rotatably mounted inside the pipe 106 downstream of the first ring 120.

The second rings 110 include both a first set of concentric rings 304 controllably rotatable about a first axis 306 and a second set concentric rings 308 controllably rotatable about a second axis 310 offset from the first axis 306. The one or more of each of the rings of the first and second set of concentric rings 304, 308 can be rotated about the first axis 306 and the second axis 310 as selected by the controller 114 to a position to alter the flow condition of the fluid downstream from the second rings 110. Each of the second rings 110 can be rotated about the respective first axis 306 or second axis 310 at any selected rotational angle between 0 degrees and 180 degrees to disrupt the fluid flow condition. The first axis 306 and the second axis 310 extend across the diameter of the pipe 106. The first axis 306 and the second axis 310 are perpendicular to each other. The first axis 306 and the second axis 310 bisect the pipe 106.

The second rings 110 are concentric about an intersection 322 of the first axis 306 and the second axis 310. The intersection 322 is the longitudinal axis of the pipe 103. As shown in FIG. 3A, the second rings 110 are positioned closer to the inner surface 128 than the intersection 322. However, the second rings 110 have any other suitable placement or spacing. For example, the second rings 110 can be evenly spaced between the inner surface 128 and the intersection 322. For example, the first set of concentric rings 304 can be biased towards the inner surface 128 and the second set of rings 308 can be biased toward the intersection. Alternatively, the first set of concentric rings 304 can be biased towards the intersection 322 and the second set of rings 308 can be biased toward the inner surface 128.

In an alternative embodiment, the first set of concentric rings 304 are interspersed with the second set of concentric rings 308. For example, the arrangement of concentric rings 110 alternates between a ring from the first set of concentric rings 304 and a ring from the second set of concentric rings 308.

Referring to FIGS. 3A-3B, the first set of concentric rings 304 are larger than second set of concentric rings 308. For example, a first ring 324 of the first set of concentric rings 304 is the largest ring, a second ring 326 of the first set of concentric rings 304 is smaller than the first ring 324, and a third ring 328 of the first set of concentric rings 304 is smaller than both the first ring 324 and the second ring 326. A first ring 330 of the second set of concentric rings 308 is the largest ring of the second set of concentric rings 308, but smaller than the smallest ring, the third ring 328 of the first set of concentric rings 304. A second ring 332 of the second set of concentric rings 308 is smaller than the first ring 330 of the second set of concentric rings 308, and a third ring 334 of the second set of concentric rings 308 is smaller than both the first ring 330 and the second ring 332 of the second set of concentric rings 308.

The second stage 118 has a first axle 312. The first set of concentric rings 304 are mounted to the first axle 312. The first axle 312 defines the first axis 306. The first set of concentric rings 304 are rotatably coupled to the first axle 312. The first axle 312 includes gears which rotate to rotate one or more of the rings of the first set of concentric rings 304 about the first axis 306.

The second stage 118 has a first motor 314 coupled to the first axle 312. The first motor 314 is coupled to the controller 114. The controller 114 sends command signals to the first motor 314 to rotate the first axle 312 in a counterclockwise or clockwise direction, which moves one or more of the first set of concentric rings 304 about the first axis 306. In this embodiment, the first axis 306 is parallel to a surface of the Earth above which the pipe 106 is situated. The first axis 306 bisects the pipe 106. The first axle 312 has two sections positioned opposite the other in the second stage 118. Each section of the first axle 312 extends from the first set of concentric rings 304 to the inner surface 128 of the pipe 106. The first motor 314 is positioned on an outer surface 316 of the pipe 106.

The second stage 118 has a second axle 318. The second set of concentric rings 308 are mounted to the second axle 318. The second axle 318 defines the second axis 310. The second set of concentric rings 308 are rotatably coupled to the second axle 318. The second axle 318 includes gears which rotate to rotate one or more of the rings of the second set of concentric rings 308 about the second axis 310.

The second stage 118 has a second motor 320 coupled to the second axle 318. The second motor 320 is coupled to the controller 114. The controller 114 sends command signals to the second motor 320 to rotate the second axle 318 in a counterclockwise or clockwise direction, which moves one or more of the second set of concentric rings 308 about the second axis 310. In this embodiment, the second axis 310 is parallel to a surface of the Earth above which the pipe 106 is situated. The second axis 310 bisects the pipe 106. The second axle 318 has two sections positioned opposite the other in the second stage 118. Each section of the second axle 318 extends from the second set of concentric rings 308 to the inner surface 128 of the pipe 106. The second motor 320 is positioned on the outer surface 316 of the pipe 106.

Each ring of the first and second sets of concentric rings 304, 308 have a cross-section. The cross-section of each ring can be a circle or a square with diameter or width between one and five millimeters, however, any suitable shape or diameter may be used.

As shown in FIGS. 3A-3B, the first and second sets of concentric rings 304, 308 are in the first position 302. The first position 302 is a first orientation of the concentric rings 110 in which the first set of concentric rings 304 and the second set of concentric rings 308 are positioned in a plane perpendicular to the flow of the fluid in the pipe 106. All of the rings of the first and second sets of concentric rings 304, 308 are in a plane bisecting the pipe 106, perpendicular to the fluid flow and imparted the lowest level of interference upon the fluid in the second stage 118, relative to the second position 402 (shown in FIG. 4), the third position (shown in FIG. 5), and the fourth position (shown in FIG. 6). The rings 304, 308 are all at 0 degrees or 180 degrees rotation. The first and second sets of concentric rings 304, 308 move from the first position 302 to other orientations offset from the perpendicular plane, such as the second position the second position 402 (shown in FIG. 4), the third position (shown in FIG. 5), and the fourth position (shown in FIG. 6). The rings 304, 308 are moved between and held in different positions using motorized actuators and/or locking mechanisms that engage at the predefined angles.

Referring to FIG. 4, the first and second sets of concentric rings 304, 308 are in the second position 402. The second position 402 is a second orientation of the concentric rings 110 in which one ring of each of the first set of concentric rings 304 and the second set of concentric rings 308 are rotated ninety degrees from the first position 302. One ring from each set 304, 308 are directly faced into the flow of the fluid in the pipe 106. All of the remaining rings of the first and second sets of concentric rings 304, 308 have not moved from the first position 302 and are in the plane bisecting the pipe 106, perpendicular to the fluid flow. Only one of the first ring 324, the second ring 326, or the third ring 328 and only one of the first ring 330, the second ring 332, or the third ring 334 are rotated ninety degrees. For example, as shown in FIG. 4, the first ring 324 from the first set of concentric rings 304 and the first ring 330 from the second set of concentric rings 308 have each rotated ninety degrees about the first axis 306 and the second axis 310, respectively, to bisect the fluid flow at the intersection 322. As the fluid flows bast the first ring 324 and the first ring 330, altering the flow condition, and increasing the flow turbulence.

Referring to FIG. 5, the first and second sets of concentric rings 304, 308 are in the third position 502. The third position 502 is a third orientation of the concentric rings 110 in which two rings of each of the first set of concentric rings 304 and the second set of concentric rings 308 are rotated from the first position 302, with one ring from each set rotated sixty degrees and the other ring from each set rotated one hundred and twenty degrees from the first position 302. Two rings from each set 304, 308 are angled into the flow of the fluid in the pipe 106. All of the remaining rings of the first and second sets of concentric rings 304, 308 have not moved from the first position 302 and are in the plane bisecting the pipe 106, perpendicular to the fluid flow.

The concentric rings 110 are in the third position 502 to further alter the turbulence of the fluid in the pipelines 102*a-b* to a degree greater than in the second position 402. In this embodiment shown in FIG. 5, the first ring 324 of the first set of concentric rings 304 is rotated sixty degrees from the perpendicular plane, the second ring 326 of the first set of concentric rings 304 is rotated one hundred and twenty degrees from the perpendicular plane, and the third ring 328 remains in the perpendicular plane. The first ring 330 of the second set of concentric rings 308 is rotated sixty degrees from the perpendicular plane, the second ring 332 of the second set of concentric rings 308 is rotated one hundred and twenty degrees from the perpendicular plane, and the third ring 334 remains in the perpendicular plane.

Referring to FIGS. 6A-6B, the first and second sets of concentric rings 304, 308 are in the fourth position 602. In FIGS. 6A-6B, the first set of concentric rings 304 has a fourth ring 404 and the second set of concentric rings 308 has a fourth ring 406. The fourth position 602 is a fourth orientation of the concentric rings 110 in which three rings of each of the first set of concentric rings 304 and the second set of concentric rings 308 are rotated from the first position 302, with one ring from each set rotated forty-five degrees, another ring is rotated ninety degrees, and third ring is rotated one hundred and thirty five degrees from the first position 302. Three rings from each set 304, 308 are angled into the flow of the fluid in the pipe 106. All of the remaining rings of the first and second sets of concentric rings 304, 308 have not moved from the first position 302 and are in the plane bisecting the pipe 106, perpendicular to the fluid flow. For example, the fourth ring 404 and the fourth ring 406 have not rotated.

The concentric rings 110 are in the fourth position 602 to further alter the turbulence of the fluid in the pipelines 102*a-b* to a degree greater than when in the second position 402 and the third position 502. When the concentric rings 110 are in the fourth position 602, the first ring 324 of the first set of concentric rings 304 is rotated forty five degrees from the perpendicular plane, the second ring 326 of the first set of concentric rings 304 is rotated ninety degrees from the perpendicular plane, the third ring 328 of the first set of concentric rings 304 rotated one hundred and thirty five degrees from the perpendicular plane, and the fourth ring 404 is still in the original position in the perpendicular plane. The first ring 330 of the second set of concentric rings 308 is rotated forty five degrees from the perpendicular plane, the second ring 332 of the second set of concentric rings 308 is rotated ninety degrees from the perpendicular plane, the third ring 334 of the second set of concentric rings 308 is rotated one hundred and thirty five degrees from the perpendicular plane, and the fourth ring 406 is still in the original position in the perpendicular plane.

The concentric rings 110 are described in this embodiment as having two sets of concentric rings 304, 308 of four rings each 324/326/328/404 and 330/332/334/406, respectively. Alternatively or in addition, the concentric rings can include more or less rings or more or less sets of concentric rings. Alternatively or in addition, multiple sets of concentric rings 110 can be placed sequentially in the second stage 118 to further alter the flow condition of the fluid.

In another embodiment, the first set of concentric rings 304 can be spaced apart from the second set of concentric rings 308. For example, the fluid can flow past the first set of concentric rings 304, and then once past the first set of concentric rings 304, the fluid can pass through the second set of concentric rings 308.

In another embodiment, multiple rings can be positioned on a single axle. For example, each axle can have two, three or four sequential rings, either spaced apart from one another or in contact.

Although four orientations of concentric rings are described here, any suitable number of orientations can be used. Although only fourty five degree, sixty, degree, and ninety degree angular spacing between rings is described here, any suitable angular spacing can be used.

Referring to FIGS. 1-6B, the controller 114 is operatively coupled to the sensor 108 and the concentric rings 110 to detect the flow condition of the fluid in the first stage 116 and alter the flow condition of the fluid in the second stage 118 by changing the orientation of one or more of the concentric rings 110. The controller 114 can determine, based on the direction and revolutions per minute of the first ring 120 (i.e., a rate of rotation of the first ring), the flow condition of the fluid in the first stage 116. Based on the determined flow condition at the first ring 120, the controller 114 can set the positions of the second rings 110.

The controller 114 can, based on a change the rate of rotation of the first ring 120, determine the flow condition of the fluid in the first stage 116. In some implementations, the rate of change can be a no rate of change condition of the rotation of the first ring 120, a first range of the rate of change of the rotation of the first ring 120, a second range of the rate of change of the rotation of the first ring 120 being greater than the first range of the rate of change of the rotation of the first ring 120, and a third range of the rate of change of the rotation of the first ring, where the third range of the rate of change of the rotation of the first ring 120 is greater than both the first and second range of the rate of change of the rotation of the first ring 120. In this implementation, the ranges for the rates of change in the rotate of the first ring 120 are: no rate of change: 0 revolutions per minute (RPM/min), a low rate of change: 0-10 RPM/min, a middle rate of change: 10-50 RPM/min, and a high rate of change: 50 or more RPM/min.

The controller 114 can then determine the flow condition of the fluid in the first stage 116 based on the rate of change of rotation of the first ring. For example, a no rate of change condition of the rotation of the first ring 120 can indicate a constant flow condition. For example, the first range of the rate of change of the rotation of the first ring 120 can indicate a low flow turbulence condition. For example, the second range of the rate of change of the rotation of the first ring 120 can indicate a middle flow turbulence condition. For example, the third range of the rate of change of the rotation of the first ring 120 can indicate a high flow turbulence condition. In this implementation, the ranges for turbulent flow (as quantified by the Reynolds number ($R_e$)): 1. No turbulence: $R_e<2300$. 2. Low turbulence: $2300<R_e<4000$. 3. Middle turbulence: $4000<R_e<10000$. 4. High turbulence: $R_e>10000$. However, any suitable set of ranges for the turbulent flow conditions may be used.

The controller 114 can include a computer with a microprocessor. The controller 114 can include one or more sets of programmed instructions stored in a memory or other non-transitory computer-readable media that stores data (e.g., connected with the printed circuit board), which can be accessed and processed by a microprocessor. The programmed instructions can include, for example, instructions for sending or receiving signals and commands to operate the sensor 108, the first motor 314, and the second motor 320. The controller 114 can store values (signals and commands) against which sensed values (signals and commands) representing the flow conditions in the first stage 116.

Referring to FIG. 1, the controller 114 can be connected to a user control device 132 by a network 134. The network 134 can be any hardwired or wireless communications network. The user control device 132 can send command signals to the controller 114 and receive status signals from the controller 114 over the network 134. For example, the user can change pre-selected values for flow conditions and respective revolutions per minute ranges. For example, the user can manually alter the orientation of the concentric rings 110. The user control device 132 can be any suitable electronic device, such as a computer, laptop, tablet, or a phone. The controller 114 and/or the user control device 132 can include one or more capabilities to improve adjusting the flow condition in the pipeline 102*a-b* such as real-time data logging and analysis capabilities, remote access for monitoring, control, and adjustment of pre-set parameters based on real time conditions, integration with other existing monitoring systems like (SCADA) for centralized control, and user-friendly interface with graphical displays of flow conditions and system status.

Figure 7:
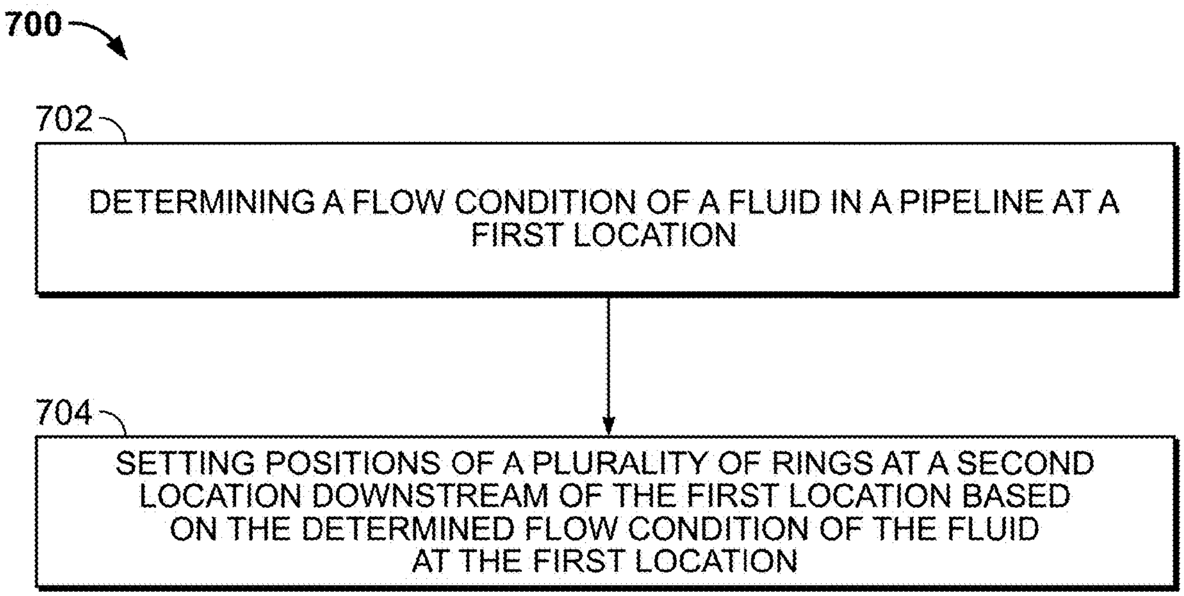
FIG. 7 is a flow chart of an example method of reducing turbulence in a pipeline according to the implementations of the present disclosure.

FIG. 7 is a flow chart of an example method of co reducing turbulence in a pipeline according to the implementations of the present disclosure. At 702, a flow condition of a fluid in a pipeline at a first location is determined. In some implementations, the fluid is a multi-phase fluid. In some implementations, determining the flow condition of the fluid in the pipeline at the first location includes sensing, by a first ring, a rotation of the first ring based on the flow condition of the fluid at the first location; receiving, at a controller, a signal representing the flow condition of the fluid at the first location; comparing, by the controller, the flow condition of the fluid at the first location to a threshold condition; and setting the positions of the rings based on the result of the comparison. For example, the first ring 120 can rotate responsive to turbulent flow in the first stage 116. The controller 114 can sense the rotation of the first ring 120, and based on the rotation, can determine a turbulent flow condition such as no turbulence, low turbulence, medium (mid-range) turbulence, or high turbulence.

In some implementations, the rotation of the first ring varies in response to a velocity of fluid flowing through the pipe. For example, as the speed at which the fluid flows through the pipe 106 can increase the speed of rotation of the first ring 120. In some implementations, determining a value of a turbulence in the pipeline at the first location based on the velocity of fluid flowing through the pipe.

At 704, based on the determined flow condition of the fluid at the first location, positions of multiple rings at a second location downstream of the first location are set. For example, based on the flow condition, the controller 114 can alter positions of the concentric rings 110.

In some implementations, setting positions of the rings at the second location includes rotating one or more rings relative to the pipeline. For example, the controller 114 can change the position of one or more of the concentric rings 110 in the second stage 118.

In some implementations, rotating one or more of the rings relative to the pipeline includes rotating at least one or more of the rings about a first axis or a second axis offset from the first axis. In some implementations, rotating one or more of the rings relative to the pipeline includes rotating at least one of a first set of concentric rings about the first axis; and rotating at least one of a first second of concentric rings about a second axis offset from the first axis. In some implementations, rotating one or more of the rings relative to the pipeline includes rotating one or more of the rings concentrically about either the first axis or the second axis.

In some implementations, rotating one or more of the rings relative to the pipeline includes rotating one or more of the rings from a first orientation in which the rings are positioned in a plane perpendicular to the flow of the fluid in the pipeline and a second orientation offset from the perpendicular plane.

In another embodiment, a system for reducing turbulence in a pipeline has a sensor, multiple concentric rings, and a controller. The sensor detects a flow condition in a pipeline. The concentric rings are rotatably mounted inside the pipeline downstream from the sensor. The controller can set positions of the concentric rings based on the detected flow condition. The concentric rings can include a first set of concentric rings controllably rotatable about a first axis and a second set concentric rings controllably rotatable about a second axis offset from the first axis. The concentric rings can have a first orientation in which the first set of concentric rings and the second set of concentric rings are positioned in a plane perpendicular to the flow of the fluid in the pipe and a second orientation offset from the perpendicular plane.

As used herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

EMBODIMENTS

In an example aspect, a system for reducing turbulence in a pipeline include a pipe, a first ring rotatably mounted inside the pipe, multiple second rings rotatably mounted inside the pipe downstream of the first ring, and a controller operatively coupled to the first ring and the second rings. The first ring is rotatable at a rate that varies in response to a velocity of fluid flowing through the pipe. The second rings include a first set of concentric rings and a second set of concentric rings. The first set of concentric rings is controllably rotatable about a first axis. The second set of concentric rings is controllably rotatable about a second axis offset from the first axis. The controller determines a flow condition of the fluid at the first ring based on a rate of rotation of the first ring and set positions of the second rings based on the determined flow condition of the fluid at the first ring.

In an example aspect combinable with any other example aspect, the first ring rotates responsive to the flow of the fluid at a rate proportional to the rate of the flow of the fluid.

In an example aspect combinable with any other example aspect, the first ring rotates about an axis bisecting the pipe.

In an example aspect combinable with any other example aspect, the second rings are concentric about an intersection of the first axis and the second axis.

In an example aspect combinable with any other example aspect, the first set of concentric rings are larger than second set of concentric rings.

In an example aspect combinable with any other example aspect, the first set of concentric rings are interspersed with the second set of concentric rings.

In an example aspect combinable with any other example aspect, the second rings have a first orientation in which the first set of concentric rings and the second set of concentric rings are positioned in a plane perpendicular to the flow of the fluid in the pipe and a second orientation offset from the perpendicular plane.

In an example aspect, a method for reduces turbulence in a pipeline. The method includes determining a flow condition of a fluid in the pipeline at a first location and setting positions of multiple rings at a second location downstream of the first location based on the determined flow condition of the fluid at the first location.

In an example aspect combinable with any other example aspect, the fluid is a multi-phase fluid.

In an example aspect combinable with any other example aspect, determining the flow condition of the fluid in the pipeline at the first location includes sensing, by a first ring, a rotation of the first ring based on the flow condition of the fluid at the first location; receiving, at a controller, a signal representing the flow condition of the fluid at the first location; comparing, by the controller, the flow condition of the fluid at the first location to a threshold condition; and setting the positions of the rings based on the result of the comparison.

In an example aspect combinable with any other example aspect, the rotation of the first ring varies in response to a velocity of fluid flowing through the pipe.

In an example aspect combinable with any other example aspect, determining a value of a turbulence in the pipeline at the first location based on the velocity of fluid flowing through the pipe.

In an example aspect combinable with any other example aspect, setting positions of the rings at the second location includes rotating one or more of the rings relative to the pipeline.

In an example aspect combinable with any other example aspect, rotating one or more of the rings relative to the pipeline includes rotating at least one or more of the rings about a first axis or a second axis offset from the first axis.

In an example aspect combinable with any other example aspect, rotating one or more of the rings relative to the pipeline includes rotating at least one of a first set of concentric rings of the rings about the first axis and rotating at least one of a first second of concentric rings of the rings about the second axis offset from the first axis.

In an example aspect combinable with any other example aspect, rotating one or more of the rings relative to the pipeline includes rotating one or more of the rings concentrically about either the first axis or the second axis.

In an example aspect combinable with any other example aspect, rotating one or more of the rings relative to the pipeline includes rotating one or more of the rings from a first orientation in which the rings are positioned in a plane perpendicular to the flow of the fluid in the pipeline and a second orientation offset from the perpendicular plane.

In an example aspect, a system for reducing turbulence in a pipeline includes a sensor, multiple concentric rings. The sensor detects a flow condition in the pipeline. The concentric rings are rotatably mounted inside the pipeline downstream from the sensor. The controller sets positions of the concentric rings based on the detected flow condition.

In an example aspect combinable with any other example aspect, the concentric rings include a first set of concentric rings and as second set of concentric rings. The first set of concentric rings are controllably rotatable about a first axis. The second set of concentric rings are controllably rotatable about a second axis offset from the first axis.

In an example aspect combinable with any other example aspect, the concentric rings have a first orientation in which the first set of concentric rings and the second set of concentric rings are positioned in a plane perpendicular to the flow in the pipe and a second orientation offset from the perpendicular plane.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A system for reducing turbulence in a pipeline, the system comprising:
- a pipe;
- a first ring rotatably mounted inside the pipe, the first ring rotatable at a rate that varies in response to a velocity of fluid flowing through the pipe;
- a plurality of second rings rotatably mounted inside the pipe downstream of the first ring, the plurality of second rings comprising:
  - a first set of concentric rings controllably rotatable about a first axis; and
  - a second set of concentric rings controllably rotatable about a second axis offset from the first axis; and
- a controller coupled to the first ring and the plurality of second rings, the controller configured to:
  - determine a flow condition of the fluid at the first ring based on a rate of rotation of the first ring; and
  - set positions of the plurality of second rings based on the determined flow condition of the fluid at the first ring.

2. The system of claim 1, wherein the first ring rotates responsive to the flow of the fluid at a rate proportional to the rate of the flow of the fluid.

3. The system of claim 1, wherein the first ring rotates about an axis bisecting the pipe.

4. The system of claim 1, wherein the plurality of second rings is concentric about an intersection of the first axis and the second axis.

5. The system of claim 1, wherein the first set of concentric rings are larger than second set of concentric rings.

6. The system of claim 1, wherein the first set of concentric rings are interspersed with the second set of concentric rings.

7. The system of claim 1, wherein the plurality of second rings having a first orientation in which the first set of concentric rings and the second set of concentric rings are positioned in a plane perpendicular to the flow of the fluid in the pipe and a second orientation offset from the perpendicular plane.

8. A method for reducing turbulence in a pipeline, the method comprising:
- determining a flow condition of a fluid in the pipeline at a first location; and
- setting positions of a plurality of rings at a second location downstream of the first location based on the determined flow condition of the fluid at the first location.

9. The method of claim 8, wherein the fluid is a multiphase fluid.

10. The method of claim 8, wherein determining the flow condition of the fluid in the pipeline at the first location comprises:
- sensing, by a first ring, a rotation of the first ring based on the flow condition of the fluid at the first location;
- receiving, at a controller, a signal representing the flow condition of the fluid at the first location;
- comparing, by the controller, the flow condition of the fluid at the first location to a threshold condition; and
- setting the positions of the plurality of rings based on the result of the comparison.

11. The method of claim 10, wherein the rotation of the first ring varies in response to a velocity of fluid flowing through the pipe.

12. The method of claim 11, further comprising determining a value of a turbulence in the pipeline at the first location based on the velocity of fluid flowing through the pipe.

13. The method of claim 8, wherein setting positions of the plurality of rings at the second location comprises rotating one or more of the plurality of rings relative to the pipeline.

14. The method of claim 13, wherein rotating one or more of the plurality of rings relative to the pipeline comprises rotating at least one or more of the plurality of rings about a first axis or a second axis offset from the first axis.

15. The method of claim 14, rotating one or more of the plurality of rings relative to the pipeline comprises:
- rotating at least one of a first set of concentric rings of the plurality of rings about the first axis; and
- rotating at least one of a first second of concentric rings of the plurality of rings about the second axis offset from the first axis.

16. The method of claim 14, rotating one or more of the plurality of rings relative to the pipeline comprises rotating one or more of the plurality of rings concentrically about either the first axis or the second axis.

17. The method of claim 14, wherein rotating one or more of the plurality of rings relative to the pipeline comprises rotating one or more of the plurality of rings from a first orientation in which the plurality of rings is positioned in a plane perpendicular to the flow of the fluid in the pipeline and a second orientation offset from the perpendicular plane.

18. A system for reducing turbulence in a pipeline, the system comprising:
- a sensor configured to detect a flow condition in the pipeline;
- a plurality of concentric rings rotatably mounted inside the pipeline downstream from the sensor; and
- a controller configured to set positions of the plurality of concentric rings based on the detected flow condition.

19. The system of claim 18, wherein the plurality of concentric rings comprises:
- a first set of concentric rings controllably rotatable about a first axis; and
- a second set of concentric rings controllably rotatable about a second axis offset from the first axis.

20. The system of claim 19, wherein the plurality of concentric rings has a first orientation in which the first set of concentric rings and the second set of concentric rings are positioned in a plane perpendicular to the flow in the pipe and a second orientation offset from the perpendicular plane.

* * * * *